May 20, 1930.   B. C. SKINNER   1,759,067
APPARATUS FOR SIZING GLOBULAR ARTICLES
Filed Jan. 11, 1928   2 Sheets-Sheet 1

Inventor
BRONSON C. SKINNER,
By Steward & McKay
His Attorneys

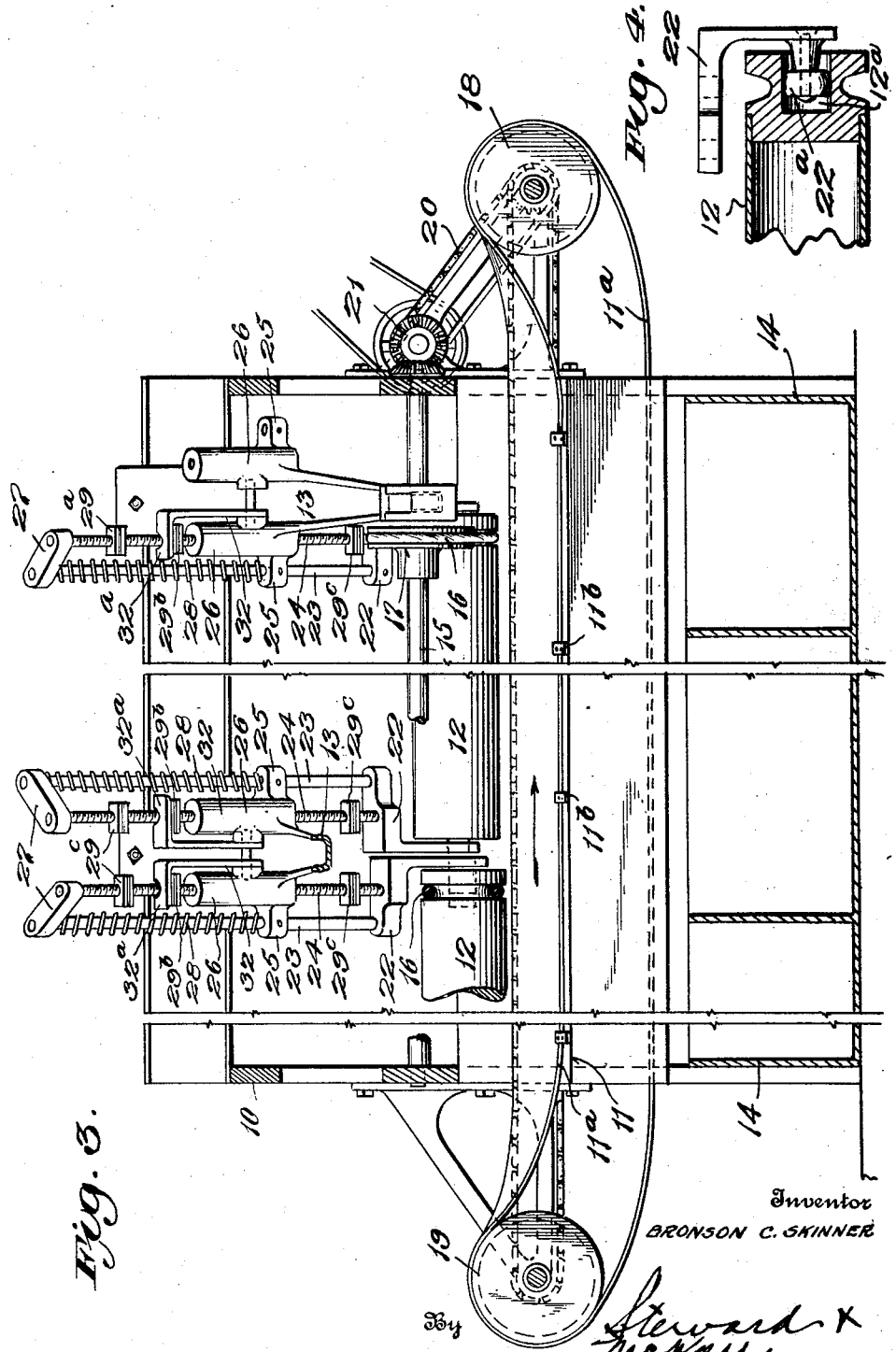

Patented May 20, 1930

1,759,067

UNITED STATES PATENT OFFICE

BRONSON C. SKINNER, OF DUNEDIN, FLORIDA, ASSIGNOR, BY MESNE ASSIGNMENTS, TO FLORIDA CITRUS MACHINERY COMPANY, OF DUNEDIN, FLORIDA, A CORPORATION OF FLORIDA

APPARATUS FOR SIZING GLOBULAR ARTICLES

Application filed January 11, 1928. Serial No. 245,984.

This invention relates to apparatus for sizing globular articles; and more particularly it relates to apparatus especially useful for sizing different classes of globular articles, which classes differ from each other as to range of size (diameter), the construction of the apparatus being such that it can be quickly and accurately adjusted to handle any one of the several classes which it may be called upon to size.

The greatest present utility of the invention is in sizing different kinds of fruits or vegetables of substantially globular shape, and it is especially adapted for sizing citrus fruits such, for example, as tangerines, oranges and grapefruit. Very commonly a citrus fruit packing house handles all these varieties of citrus fruit, and it frequently happens that after one variety has been run through the sizing apparatus for some time, one of the other varieties must be immediately run through. Since these different varieties are characterized by different size or diameter ranges, it is of course necessary to adjust the sizing apparatus accordingly, and it is one of the principal objects of the present invention to enable this adjustment to be accomplished easily, quickly and accurately.

Another object of the invention is to provide improved means for effecting very small variations in adjustment of the sizing apparatus to obtain close regulation between different fruits, such as tangerines and oranges, which differ very little in size.

Another object of the invention is to provide simplified adjusting mechanisms for initially setting the machine to handle any one of several different fruits, such as tangerines, oranges and grapefruit and for instantly changing the machine over from one fruit to another once the initial setting has been made.

Still another object of the invention is to provide improved bearings for adjustable rolls which comprise part of the sizing apparatus, with resulting increased flexibility of adjustment.

Well known sizing apparatus for handling globular articles such as fruit or vegetables commonly comprises essentially two cooperating gauging or sizing elements (one of which may comprise a plurality of sizing members) so arranged with respect to each other as to form what may be termed a gauging runway which provides a gauging aperture or a series of gauging apertures of sizing diameter gradually increasing or decreasing lengthwise of the machine in the direction of travel of the fruit, depending upon the particular type of sizer in question. In that type in which the effective size of the gauging aperture or apertures gradually increases, each piece of fruit is caused to travel in contact with these cooperating gauging or sizing members until it reaches a point where the width of the space or aperture between said members is slightly greater than the diameter of the fruit, whereupon the fruit escapes through the aperture and is discharged into a receiving bin along with other fruit of approximately the same size. An example of this type is the so-called belt-and-roll sizer in which a traveling belt, which virtually constitutes one of the gauging or sizing elements, carries the fruit along in contact with a series of sizing rolls which are successively spaced farther away from the belt, said series of rolls constituting the other sizing element. In that type in which the gauging aperture or apertures gradually decrease in size, one of the gauging or sizing elements or members comprises a plurality of movable parts, such as belts, so arranged transversely with respect to the other gauging member or element as to selectively act in a positive manner upon the several sizes of fruit to direct it into the proper respective receiving bins.

In both types of sizing apparatus, however, it is to be observed that the construction includes essentially two gauging or sizing members, either one of which or both, may consist of a plurality of sub-divisions or parts, said gauging or sizing members cooperating to provide a sizing aperture or series of sizing apertures increasing or decreasing in width, in the direction of fruit travel, in a predetermined and methodical manner to enable fruit of different predetermined sizes to be selectively discharged from the machine at proper points. Furthermore at least one of the sizing members or elements is arranged to be adjustable with respect to the other, so that the widths of the sizing apertures may be increased or diminished as is necessary to handle different classes or kinds of articles, such as different fruits, which differ characteristically in range of sizes or diameters.

The present invention has to do particularly with the manner of mounting the adjustable gauging or sizing member of a sizing machine of the general character hereinabove set forth, and the means for holding said sizing member in any desired adjusted position. In general, the novel construction which is herein disclosed, and by which the objects of the invention are achieved, provides for setting the adjustable sizing or gauging member, or the component parts thereof, at any desired predetermined distances from the other sizing or gauging member, and holding the adjustable member in such predetermined position by means constantly exerting a thrust in a direction tending to increase the width of the gauging or sizing aperture. Movable stop means cooperating with the thrust means aforesaid are provided and arranged in such a way as to be movable quickly and accurately into and out of stopping position for adjustment of the gauging aperture to any of the several widths for which the mechanism may be designed.

In the preferred form of the invention the adjustable sizing member is supported by a hanger including a rod which is slidable in a supporting bracket to permit the adjustable sizing member to be moved up and down. A plurality of stops, usually three in number, are adjustably mounted on the rod, and means are provided for selectively engaging these stops to hold the rod and sizing member in any adjusted position corresponding to the setting of the stops. The stops are set individually for different kinds of fruit, such as tangerines, oranges and grapefruit. The engaging means preferably consists of a multiple latch having portions or arms of unequal length for selectively engaging the stops to hold the sizing member in the desired position, preferably against spring tension.

An important advantage of this construction is that it provides for very small variations in adjustment of the sizing apparatus, down to a sixteenth of an inch or even less, regardless of the thickness of the stops. In practice the two stops previously set, say for oranges and tangerines, may be spaced some distance apart on the adjustable rod, but the difference in the adjustment obtained by engaging one arm of the multiple latch with one stop and that obtained by engaging a different unequal arm with the other stop may be a small fraction of an inch.

In sizing different citrus fruits one arm of the multiple latch will ordinarily engage one stop for one fruit, and another arm will engage a different stop for another fruit, but if desired each arm may selectively engage any one of the stops and thereby provide a still greater number of adjustments. In the particular embodiment of the invention illustrated herein the multiple latch is provided with only two arms, one for engaging a stop set for tangerines and the other for engaging a stop set for oranges, while the stop which is set for grapefruit is adapted to engage the under side of the main supporting bracket to hold the sizing member in the third position.

With the above objects in view, as well as others which will become apparent as the description proceeds, the invention comprises the novel construction, combination and arrangement of apparatus parts, of which a typical concrete example will be hereinafter specifically described by way of explaining the principles of the invention, and which will then be more particularly pointed out in the claims.

In order to make clear the underlying principles of the invention, an apparatus embodying the same and particularly adapted to size different kinds and sizes of citrus fruit, such as tangerines, oranges and grapefruit, will now be described in detail in connection with the accompanying drawings in which Fig. 1 is a cross section of a sizer of the belt-and-roll type;

Fig. 2 is a top view, with certain parts omitted for the sake of clearness, partly in section on the line 2—2 of Fig. 1, and looking in the direction of the arrows;

Fig. 3 is a side elevation of the sizer; and

Fig. 4 is a detail showing a desirable construction for the bearings of the adjustable gauging or sizing rolls.

In the sizer here illustrated, 10 designates generally the frame of the sizer. Brackets 10$^a$ carry transversely inclined floor or track 11, upon which runs inclined conveyor belt 11$^a$, held in place by guides 11$^b$ and constituting in this instance one of the sizing elements or members. With this belt cooperate a series of adjustable gauging or sizing rolls 12, hung from fixed arms or brackets 13, as hereinafter described, and arranged end to end, and spaced at successively greater distances from said conveyor in such manner as to form therewith a long gauging or sizing opening or outlet which increases in width progressively from the feeding-in end of the apparatus to the opposite end, that is, in the direction of fruit travel. With this type of sizing apparatus, the fruit when fed to the machine immediately rolls transversely on the inclined belt until it is stopped by the super-adjacent sizing roll, and then continues to travel in contact with both the belt and that roll or one or more succeeding rolls, in the direction of the arrow in Fig. 3, until the sizing opening is large enough to let the fruit escape and roll from the apparatus into receiving bins as indicated at 14 for example. The gauging rolls 12 are driven from shaft 15 carried in suitable bearings on the supporting arms or brackets 13, through suitable belt and pulley connections indicated generally at 16, 17. In practice the rolls are rotated clockwise as viewed in Fig. 1, that is, in a direction tending to move the fruit upwardly across the inclined conveyor belt, rather than downwardly, since the latter would cause pinching of the fruit with resultant injury thereto. The belt 11$^a$ moves substantially horizontally and passes around drums 18, 19, being driven by drum 18 to which power is transmitted by chain and sprocket mechanism indicated generally by 20—21.

The means by which the adjustable gauging or sizing rolls are supported in proper position in accordance with the principles of the invention will now be described. Each sizing roll is supported at each of its ends by a hanger device adjustably carried by one of the arms 13 before referred to. The hanger device may take various specific forms, but the construction here shown and described has practical advantages. Each pair of hangers supporting the adjacent ends of two successive gauging rolls of the series is carried by one of the aforesaid supporting arms 13 which are bolted or otherwise rigidly secured to the frame of the apparatus in such manner as to extend above and across the conveyor belt 11. The form of hanger here illustrated comprises a bearing member 22, to which are secured two rods 23 and 24 extending through and slidable in apertured boss 25 and sleeve 26, respectively, formed on the supporting arm 13. The upper ends of the rods 23 and 24 are joined by a yoke element 27 rigidly secured to both. Surrounding rod 23 and compressed between boss 25 and yoke member 27 is compression spring 28, tending by its thrust to move the hanger, and thereby the gauging roll 12, upwardly away from the conveyor belt 11, and thus to enlarge the gauging or sizing opening. In order to arrest this movement and to hold the gauging roll at any predetermined desired distance away from the conveyor belt, quickly and accurately adjustable stop means are provided preferably including means for selectively engaging successive linear portions of the adjustable rod 24. In the construction shown, rod 24 is threaded and carries a plurality of stop nuts 29$^a$, 29$^b$, 29$^c$, in this instance three in number, which can be screwed along the threaded rod into any desired stopping position. These nuts may advantageously be of the spring type, as shown, in order to lessen the chance of their accidentally turning after being set in proper position. Cooperating with the two upper stop nuts 29$^a$, 29$^b$, is a multiple hook or latch device pivoted on the supporting arm 13 at 30, and having two arms 31 and 32 of unequal length, as shown, and provided with hooked ends 31$^a$ and 32$^a$, respectively. In the position shown in the drawing, the shorter hooked arm 32 is shown cooperating with the stop nut 29$^b$, said nut being pressed upwardly against the hook 32$^a$ to hold the gauging roll in the position nearest the belt of the three positions for which it is intended in the present illustration to be set. For example, this may be the desired position of the roll for tangerines.

To set the machine for oranges, for example, the operator presses down on the end of roll 12, in order to permit disengaging hook 32$^a$ from nut 29$^b$, swings latch arm 31 into alinement with rod 24 and then allows the mechanism to rise until nut 29$^a$ engages with hook 31$^a$. Due to the positioning of the nuts 29$^a$ and 29$^b$ and the proportioning of the arms 31 and 32, the roll 12 is now a somewhat greater distance from belt 11 than before. If both hooks 31$^a$ and 32$^a$ are disengaged from nuts 29$^a$ and 29$^b$, the mechanism will cause roll 12 to rise until nut 29$^c$ strikes the under side of arm 13, thereby adjusting the machine to size still larger articles, say grapefruit. It is evident that nuts 29$^a$ and 29$^b$ can be so positioned on rod 24 that both nuts can be selectively engaged by either latch arm 31, 32, to give four corresponding positions of roll 12.

The novel construction described above permits the stop nuts 29$^a$, 29$^b$, and 29$^c$ for each sizing roll to be set in their proper respective positions for the several fruits before the machine is started in operation, and thereafter the change from one fruit to another may be made instantly without further computation of settings. To illustrate the small variations in adjustment obtainable, the first roll at the left end of Fig. 3 might be set to provide an opening or runway of 2¼ inches for oranges, and 2$\frac{1}{16}$ inches for tangerines; while the next succeeding roll might be set to provide a runway of 2½ inches for oranges, and either 2$\frac{9}{16}$ inches or 2$\frac{7}{16}$ inches for tangeries. Variations in adjustment as close as $\frac{1}{16}$ inch, or even ¼ inch, require a multiple or two-position latch because even if the stop nuts were mounted close together on the rod 24 the mere thickness of the stop nuts would preclude small variations in adjustment with a one-position or single-arm latch. In the above illustration of possible adjustment of the second roll it will be noted that the setting for tangerines might have to be $\frac{1}{16}$ inch on either side of the setting for oranges, which with a single-position latch would present an added difficulty in effecting adjustment of the stop nuts.

Referring to Fig. 4, 22$^a$ is a rounded or substantially spherical bearing carried by bearing bracket 22 and received by substantially cylindrical recess 12$^a$ in the ends of each of rolls 12. By this arrangement the ends of each roll may be individually adjusted to different levels, if desired, without impairing the effectiveness of their operation. This has practical advantages since packing house operators sometimes desire to have that end of each roll which is nearest the feeding end of the machine, higher than the other end, in order that all of the fruit of a particular size may drop out at one point.

It is to be understood that numerous arrangements other than those hereinabove specifically referred to are within the scope of the invention and of the appended claims.

What is claimed is:

1. Apparatus for sizing globular articles comprising a conveyor, a sizing element spaced from said conveyor to provide a sizing outlet, an adjustable support for said sizing element to permit it to be moved toward and away from said conveyor to vary the size of said outlet, a plurality of individually adjustable stops mounted one above the other on said support, and means for selectively engaging said stops to hold said sizing element in adjusted position.

2. Apparatus for sizing globular articles comprising a conveyor, a sizing element spaced from said conveyor to provide a sizing outlet, an adjustable rod supporting said sizing element to permit it to be moved toward and away from said conveyor to vary the size of said outlet, a plurality of stops adjustably mounted on said rod, and means for selectively engaging said stops to hold said sizing element in adjusted position.

3. Apparatus for sizing globular articles comprising a conveyor, a sizing element spaced from said conveyor to provide a sizing outlet, an adjustable support for said sizing element to permit it to be moved toward and away from said conveyor to vary the size of said outlet, means continuously exerting a force upon said support tending to move said sizing element in one direction, and means for selectively engaging different linear portions of said support to check said force in different predetermined positions of said sizing element.

4. Apparatus for sizing globular articles comprising a conveyor, a sizing element spaced from said conveyor to provide a sizing outlet, an adjustable rod supporting said sizing element to permit it to be moved toward and away from said conveyor to vary the size of said outlet, means including a spring acting on said rod to move it in one direction, a plurality of nuts threaded upon said rod to permit them to be adjusted in different positions on said rod, and means for selectively engaging said nuts to hold said rod and said sizing element in adjusted position against the tension of said spring.

5. Apparatus for sizing globular articles comprising a conveyor, a plurality of sizing rolls disposed in end-to-end relation longitudinally of said conveyor and spaced therefrom to provide a series of graduated sizing outlets, a plurality of slidable members supporting said rolls to permit them to be moved toward and away from said conveyor to vary said outlets, and means normally disconnected from said slidable members and adapted to selectively engage different linear portions of said members to maintain said rolls in adjusted position.

6. Apparatus for sizing globular articles comprising a convyor, a plurality of sizing rolls disposed in end-to-end relation longitudinally of said conveyor and spaced therefrom to provide a series of graduated sizing outlets, a plurality of adjustable hangers supporting said rolls to permit them to be moved toward and away from said conveyor, a plurality of individually adjustable stops disposed one above the other on said hangers, and means associated with each of said hangers for selectively engaging said stops to hold said rolls in adjusted position.

7. Apparatus for sizing globular articles comprising a conveyor, a plurality of sizing rolls disposed in end-to-end relation longitudinally of said conveyor and spaced therefrom to provide a series of graduated sizing outlets, a plurality of adjustable hangers each including a rod supporting said rolls to permit them to be moved toward and away from said conveyor, a plurality of nuts mounted adjustably on each of said rods, and means for selectively engaging the nuts on each of said rods to hold said rolls in adjusted position.

8. Apparatus for sizing globular articles comprising a conveyor, a plurality of sizing rolls disposed in end-to-end relation longitudinally of said conveyor and spaced therefrom to provide a series of graduated sizing outlets, a plurality of adjustable hangers each including a rod supporting said rolls to permit them to be moved toward and away from said conveyor, means including springs acting on said rods to move the rods and associated rolls in one direction, a plurality of stops adjustably mounted on each of said rods and having means for maintaining them against displacement on said rods, and a member associated with each of said rods for selectively engaging said stops to hold said rolls in adjusted position against the tension of said springs.

9. Apparatus for sizing globular articles comprising a conveyor, a sizing element spaced from said conveyor to provide a sizing outlet, means including an adjustable rod supporting said sizing element to permit it to be moved toward and away from said conveyor to vary the size of said outlet, a plurality of stops mounted on said rod, and a device having a plurality of parts of unequal length for selectively engaging said stops to hold said rod and sizing element in adjusted position.

10. Apparatus for sizing globular articles comprising a conveyor, a sizing element spaced from said conveyor to provide a sizing outlet, means including an adjustable rod supporting said sizing element to permit it to be moved toward and away from said conveyor to vary the size of said outlet, a plurality of stops mounted on said rod, and a pivoted latch having a plurality of arms of different lengths selectively engageable with said stops to hold said rod and sizing element in adjusted position.

11. Apparatus for sizing globular articles comprising a conveyor, a plurality of sizing rolls disposed in end-to-end relation longitudinally of said conveyor and spaced therefrom to provide a series of graduated sizing outlets, a plurality of adjustable rods supporting said rolls to permit them to be moved toward and away from said conveyor, a plurality of stops mounted on said rods, and latches each having a plurality of arms of different lengths for selectively engaging said stops to hold said rods and rolls in adjusted position.

12. Apparatus for sizing globular articles comprising a conveyor, a plurality of sizing rolls disposed in end-to-end relation longitudinally of said conveyor and spaced therefrom to provide a series of graduated sizing outlets, a plurality of adjustable rods supporting said rolls to permit them to be moved toward and away from said conveyor, a plurality of stops adjustably mountd on said rods, and pivoted latches each having a plurality of arms of different lengths for selectively engaging said stops to hold said rods and rolls in adjusted position.

13. Apparatus for sizing globular articles comprising a conveyor, a plurality of sizing rolls disposed in end-to-end relation longitudinally of said conveyor and spaced therefrom to provide a series of graduated sizing outlets, a plurality of brackets, rods adjustable in said brackets and supporting said rolls to permit them to be moved toward and away from said conveyor, a plurality of stops mounted on said rods, and latches pivoted on said brackets having a plurality of arms of unequal length for selectively engaging said stops to hold said rolls in adjusted position.

14. Apparatus for sizing globular articles comprising a conveyor, a plurality of sizing rolls disposed in end-to-end relation longitudinally of said conveyor and spaced therefrom to provide a series of graduated sizing outlets, a plurality of adjustable hangers each including a slidable rod supporting said rolls to permit them to be moved toward and away from said conveyor, a plurality of stops adjustably mounted one above the other on each of said rods, and movable latches adapted in one position to engage one stop and in another position to engage another stop to hold said rods and rolls in adjusted position.

15. Apparatus for sizing globular articles comprising a conveyor, a plurality of sizing rolls disposed in end-to-end relation longitudinally of said conveyor and spaced therefrom to provide a series of graduated sizing outlets, a plurality of brackets, rods adjustable in said brackets and supporting said rolls to permit them to be moved toward and away from said conveyor, a plurality of nuts adjustably mounted on said rods, and latches pivoted on said brackets having a plurality of arms of unequal length adapted to be moved selectively into alinement with said rods, said arms having hooked ends adapted to partly encircle said rods and engage said nuts to hold said rolls in adjusted position.

16. Apparatus for sizing globular articles comprising a conveyor, a plurality of sizing rolls disposed in end-to-end relation longitudinally of said conveyor and spaced therefrom to provide a series of graduated sizing outlets, a plurality of brackets, rods adjustable in said brackets and supporting said rolls to permit them to be moved toward and away from said conveyor, springs acting on said rods to move said rolls away from said conveyor, a plurality of stops adjustably mounted on the upper portions of said rods above the brackets, means for selectively engaging said stops to hold said rolls in adjusted position against the action of said springs, and a stop adjustably mounted on the lower portion of each of said rods below said brackets and engageable with the under side of the respective brackets to hold said rolls in still another position against the action of said springs.

17. Apparatus for sizing globular articles comprising the combination, with a belt conveyor, a plurality of sizing rolls disposed in end-to-end arrangement longitudinally of said conveyor and spaced away therefrom to provide a series of graduated sizing outlets, of adjustable supporting means for said rolls comprising a plurality of hangers, one for each end of each roll, a plurality of supporting brackets or arms, each hanger being carried by one of said brackets and being slidable thereon into different positions, spring means tending to slide said hanger on its bracket in a direction to move the corresponding roll farther away from said conveyor, stops carried by said hanger, and a latch device mounted on said bracket and operable to selectively engage said stops and thus to hold the hanger and the roll supported thereby in adjusted position.

18. Apparatus for sizing globular articles comprising the combination, with carrier means and a plurality of horizontally disposed rolls cooperating therewith to form a series of graduated discharge outlets for articles to be sized, of mechanism for supporting and adjusting each end of each of said rolls, said mechanism including a bearing member in which said roll is journaled, a pair of rods supporting said bracket member, a supporting arm for said bracket member apertured for sliding passage of said rods, a yoke member connecting the tops of said rods, a spring coiled around one of said rods and compressed between said supporting arm and said yoke member and tending to move the roll farther away from said carrier means, a plurality of stop nuts engaging threads on the other of said rods, a latch device operable to engage said stop nuts selectively whereby expansion of said spring and the size of said discharge outlets is positively checked at predetermined sizing positions of said roll.

In testimony whereof I hereunto affix my signature.

BRONSON C. SKINNER.